United States Patent [19]
Torimoto et al.

[11] 3,881,613
[45] May 6, 1975

[54] REFUSE COLLECTION VEHICLE

[75] Inventors: Hideo Torimoto, Akashi; Yoshimitsu Shibayama, Kariya; Takashi Nakano, Chiryu, all of Japan

[73] Assignee: Kyokuto Kaihatsu Kogyo Co., Ltd., Toyota, Japan

[22] Filed: Feb. 12, 1974

[21] Appl. No.: 441,896

[30] Foreign Application Priority Data
Feb. 19, 1973  Japan.............................. 48-20538

[52] U.S. Cl.............................. 214/83.3; 214/515
[51] Int. Cl.............................................. B65f 3/02
[58] Field of Search ............ 214/82, 83.3, 503, 515, 214/83.32, 83.24, 146.5, 372, 621; 198/218; 226/158

[56] References Cited
UNITED STATES PATENTS

| | | | |
|---|---|---|---|
| 3,370,525 | 2/1968 | Bowles | 214/83.3 |
| 3,490,631 | 1/1970 | Smith | 214/503 |
| 3,817,415 | 6/1974 | Lewis | 214/83.3 |

Primary Examiner—Robert J. Spar
Assistant Examiner—Lawrence J. Oresky
Attorney, Agent, or Firm—Craig & Antonelli

[57] ABSTRACT

A refuse collection vehicle of a rear loading type which comprises a dumper frame mounted on the rear of a vehicle chassis a container interchangeably mounted on the dumper frame and having a refuse receiving opening at the rear, a tailgate loading hopper supported at the rear of the container for pivotal movement between raised and lowered positions and formed with a discharge opening and a rear opening substantially opposed to the discharge opening, and a packer plate assembly housed in the tailgate loading hopper for compressing and transferring refuse dumped into the rear opening.

14 Claims, 17 Drawing Figures

REFUSE COLLECTION VEHICLE

The present invention relates to a refuse collection vehicle and, more particularly, to a refuse collection vehicle having a replaceable container and a tailgate assembly for packing the refuse into said container.

According to a conventional refuse collection vehicle for a similar purpose, it has been a practice for the vehicle to go round houses and factories for refuse collection, and directly transport the collected refuse to a refuse burning place or a land to be reclaimed. However, such places for refuse disposal are generally located far from cities for the prevention of pollution, and the efficiency for the refuse collection is lowered to a large extent by transporting the collected refuse directly to distant refuse dump yard by the same refuse collection vehicle. In order to overcome the above problems, it has recently been considered that the refuse collected in the city area is once pooled in a temporary refuse dump yard within the city, and then transported to the dump yard in the suburbs by a separate vehicle with large capacity. For the above system, it is very effective from the view point of time and labor to employ a replaceable container so that the filled-up container can be replaced with an empty one for further refuse collection.

In the conventional refuse collection vehicle of a similar character, however, besides the fact that a refuse receiving body is unable to be replaced, a packer plate of a rear loader mechanism for packing the refuse into the body is adapted to move only up to a refuse receiving opening of the body, which results in insufficient packing density of the refuse in the body. Even if the body is arranged to be replaceable in such conventional collection vehicles, strewing of refuse is unavoidable, largely lowering the efficiency for refuse collection and handling.

Accordingly, an essential object of the present invention is to provide a refuse collection vehicle having a replaceable container for efficient refuse collection and disposal.

Another important object of the present invention is to provide a refuse collection vehicle having a replaceable container with improved means for preventing refuse from spilling especially in replacing.

A further object of the present invention is to provide a refuse collection vehicle with improved means having a packer plate adapted to go sufficiently deep into a container for packing the refuse into the container at a maximum density.

A still further object of the present invention is to provide a refuse collection vehicle with a tailgate loading hopper which can be operated with simple controls employing hydraulic rams.

According to a preferred embodiment of the present invention, the refuse collection vehicle comprises a dump frame pivotally mounted on a vehicle chassis, a container interchangeably mounted on the dumper frame and having a refuse receiving opening at the rear, a tailgate loading hopper supported at the rear of the container for pivotal movement between raised and lowered positions and formed with a discharge opening and a rear opening opposed to the discharge opening and a packer plate mechanism housed in the tailgate hopper for compressing and transferring refuse dumped into the rear opening. The dumper frame is adapted to be raised or lowered by a hydraulic ram extending between the chassis and the dumper frame, while the container is fastened to or released from the dumper frame by simply operating a locking device provided between the lower under corners of the container and the corresponding points on the dumper frame. The container comprises a pair of side walls, a bottom plate, a ceiling wall and front and rear walls assembled ito a box like shape and has a refuse receiving opening formed in the rear wall. The rear wall is hinged to provide a large opening for removing refuse within the container to the outside. A small door of a sufficient size to cover the refuse receiving opening is slidably provided so that the small door can slide upward or downward over the surface of the large door along grooves provided on opposite sides of the large door. A suitable resilient plate of rubber or the like is provided around said refuse receiving opening of rectangular shape and the rubber plate further comprises a plurality of plate segments, for example, four segments secured to the four side edges of said opening. When a discharge opening of the tailgate hopper is inserted into said opening, the rubber plate is adapted to be pushed open along the sides of the discharge opening, and when the discharge opening is withdrawn, it closes the refuse receiving opening of the container. The provision of the small door adapted to close the opening when the tailgate loading hopper is raised for removal of the container, and the resilient rubber plate acting as a valve is very efficient for preventing the strewing of the refuse in handling the container.

Furthermore, the tailgate loading hopper is provided with an improved packer plate mechanism in which a packer plate is adapted, by means of a link mechanism and hydraulic rams to go sufficiently deep into the container through the refuse receiving opening to pack the refuse into the container at a high density, which, together with the adoption of the above small door and rubber plate, makes it possible to employ the container system with the highest efficiency. The operation of the tailgate loading hopper including the packer plate and raising or lowering of the dumper frame can be effected easily by means of hydraulic rams.

These and other objects and features of the present invention will become apparent from the following description taken in conjunction with the preferred embodiment thereof with reference to the accompanying drawings, in which.

Before the description of the present invention proceeds, it is to be noted that like parts are designated by like numerals throughout the views of the accompanying drawings.

Referring now to FIGS. 1, 2, 3 and 4, the refuse collection vehicle of a rear loading type generally comprises a vehicle chassis 2 with a dumper frame 3 thereon which is pivotally attached to the rear of the vehicle chassis 2, a container 5 interchangeably mounted on the dumper frame 3 and fixed thereto by means of a locking device, and a tailgate loading hopper 7 which is provided at the rear of the container 5.

The dumper frame 3 further comprises a pair of spaced, substantially L-shaped frames, each having a horizontal portion 3a adapted to rest on the chassis 2 and an upright portion 3b which extends at right angles to said horizontal portion 3a at the rear of the vehicle, forming a vertical support 6. The height of each of said vertical supports 6 is substantially or approximately equal to the height of the container 5 above the damper frame 3. Each of the supports 6 is provided with a hole 9a close to the upper end thereof for pivotally connecting the tailgate hopper 7 by a pin. A small, rectangular piece of metal 42 is rotatably attached on the dumper frame 3 at four positions corresponding to four lower corners of the container 5 to form a part of a locking device for said container 5, which will be mentioned later. The dumper frame 3 is pivotally connected to the chassis 2 adjacent the bents of said L-shaped frames 3a and 3b thereof by means of a pair of pivotal connections 4 and is adapted to be moved between rest and raised positions by means of a hydraulic ram P1, the cylinder end of the ram P1 being pivotally mounted on the chassis 2 and the piston rod thereof being pivotally secured to the L-shaped frame 3a of the dumper frame 3. Extension of the ram P1 accordingly brings the dumper frame 3 onto the raised position.

Figure 2:
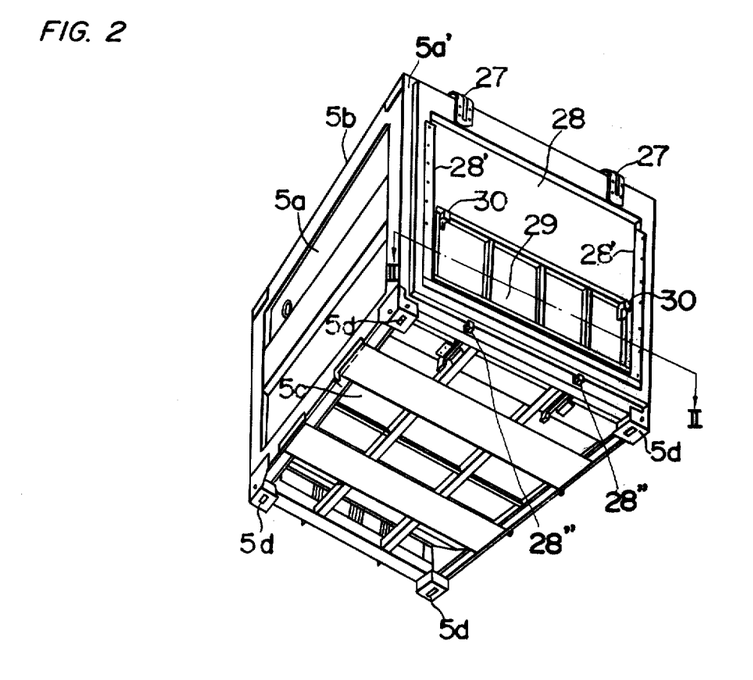
FIG. 2 is a schematic perspective view of the container shown in FIG. 1.
Figure 3:
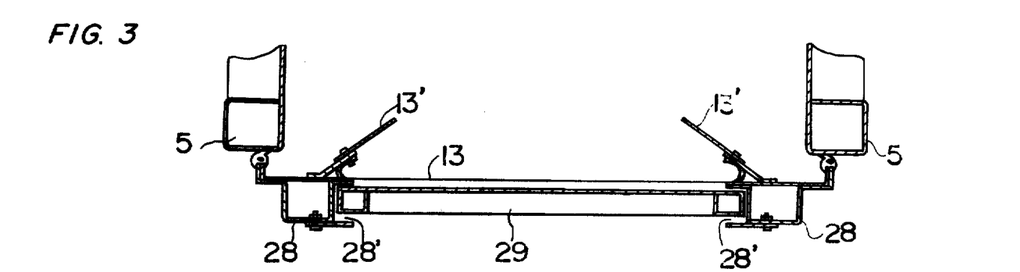
FIG. 3 is a cross-sectional view taken along the line II—II in FIG. 2.

The container 5 generally comprises opposite side walls 5a, a top wall 5b, a bottom wall 5c and front and rear walls 5a', and is suitably braced as in FIG. 2. The rear wall 5a' facing the tailgate hopper 7 is formed into a large door 28 adapted to be opened or closed about a pair of hinges 27 provided on the upper edge thereof and a rectangular refuse receiving opening 13 of a size which can receive the discharge opening 14 of the tailgate hopper 7 is formed at the lower part of the large door 28. A pair of latches 28'' are provided at the lower edge of the door 28 for locking purpose. A suitable rubber plate 13' is provided around the rectangular opening 13, which, in practice, comprises a plurality of plate segments for example, four segments secured to the four side edges of the opening 13 so as to selectively close and open the opening 13 in a similar manner to the valve of a heart. A small door 29 of a size sufficient to cover the opening 13 is provided, which is adapted to slide upward or downward over the surface of the large door 28 along grooves 28' provided on both sides of the door 28. A pair of studs 30 are secured at opposite upper corners of the small door 29 for supporting the door 29 when raising or lowering. At the under face of each corner, the container 5 is provided with a rectangular hole 5d into which the rectangular shaped piece of metal 41 on the dumper frame 3 is inserted to form a container locking device.

Figures 4, 5:
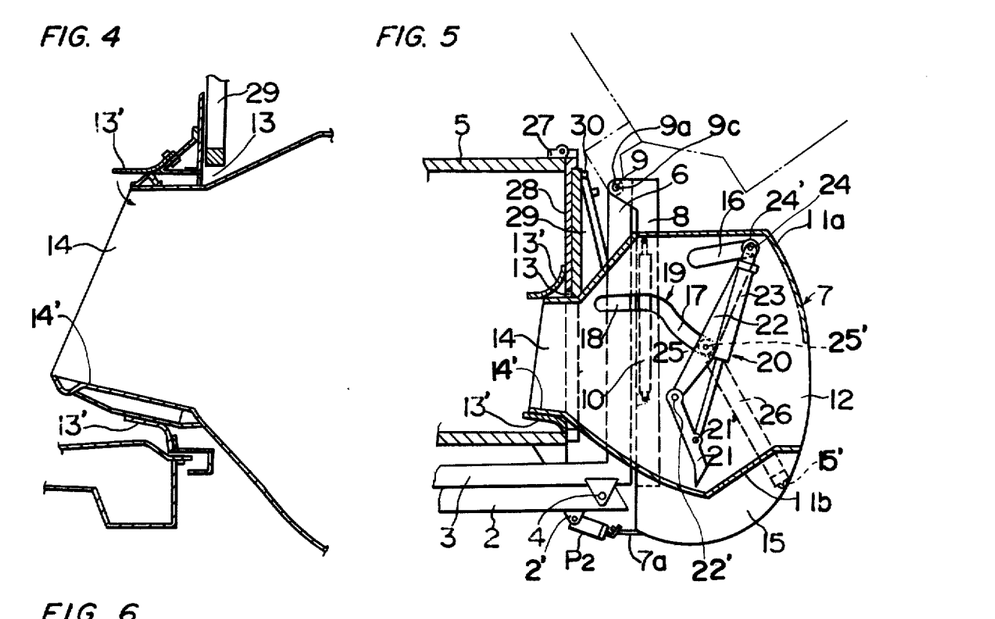
FIG. 4 is a side sectional view of a portion at the rear of the container, showing an arrangement at a refuse receiving opening of the container with a discharge mouth of a discharge opening of a tailgate loading hopper engaged in the refuse receiving opening.
FIG. 5 is a side sectional view as in FIG. 4, but showing the detail of a packer plate mechanism in the tailgate loading hopper.
Figure 6:
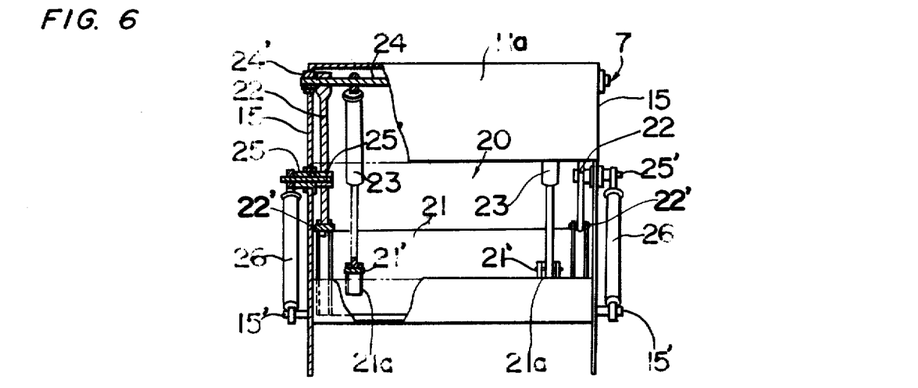
FIG. 6 is a rear elevational view of the packer plate mechanism in FIG. 5 with a part broken away.

Referring to FIGS. 5 and 6, the tailgate loading hopper 7 extending across the width of the container 5 comprises side walls 15, a top 11a and a hopper portion 11b at the bottom which define a discharge opening 14 at the front and a rear opening 12 at the rear of the tailgate hopper 7. The discharge opening 14 corresponding to the size of the refuse receiving opening 13 of the container 5 is further provided with a discharge mouth 14' secured to and extending outwardly from the opening 14, and the discharge mouth 14' is adapted to be inserted into the refuse receiving opening 13 of the container 5 so that the container 5 is in communication with the tailgate hopper 7 when the latter is in the lowered position.

It should be noted here that when the discharge mouth 14' of the tailgate hopper 7 is inserted into the refuse receiving opening 13 of the container 5 as above, the resilient plate 13' provided on the periphery the opening 13 is pushed into the container 5 along the sides of the discharge mouth 14' for preventing the spilling of the rubbish.

An arm plate 8 with a hole 9 close to the upper end thereof is rigidly attached to each of the side walls 15 of the tailgate hopper 7, and the whole tailgate hopper 7 is rotatably supported by the supports 6 of the dumper frame 3 by pins 9c through the holes 9 of the arm plates 8 and the holes 9a of the supports 6, thus the whole tailgate hopper 7 being adapted to be raised or lowered in relation to the pins 9c by means of a pair of hydraulic rams 10 extending between the lower parts of the supports 6 of the dumper frame 3 and the upper parts of the arm plates 8 on opposite sides of the tailgate hopper 7. A small hydraulic ram P2 extends between a bracket 2 at the underside of the chassis 2 and a hook 7a fixed to the lower part of the side wall 15 for securing the tailgate hopper 7 in position in its lowered condition shown in FIG. 5.

In each of the side walls 15 of the tailgate hopper 7, there is formed an upper guide slot 16 extending from the rear to the front at the upper part of the wall 15. At the middle portion of each side wall 15, a middle guide slot 19 comprising a curved slot 17 having a radius of curvature centered at the rear end of the upper guide slot 16 and a horizontal slot 18 extending from the rear to the front is formed.

The packer plate mechanism 20 generally comprises a packer plate 21 extending the width of the discharge opening 14 with height corresponding the height of the opening 14, and a pair of arm plates 22 and first and second hydraulic rams 23 and 26 provided on opposite sides of the tailgate hopper 7. A transverse shaft 24 with a roller 24' at each end thereof is supported between the upper guide slots 16 in the side walls of the tailgate hopper 7, each of which rollers 24' is slidably received in each of the slots 16. The upper portions of the arm plates 22 are pivotally mounted on the shaft 24 adjacent the opposite side walls 15 of the tailgate hopper 7, while the middle portions of the plates 22 are provided with rollers 25 rotatably mounted on pins 25' fixed on the plates 22, each of which rollers is also slidably received in each of the guide slots 17. The lower ends of the arm plates 22 are pivotally connected to the opposite upper corners of the packer plate 21 by pins 22'. Each of the first hydraulic rams 23 has its one end pivotally connected to the shaft 24 and the other end also pivotally secured by a pin 21' to a bracket 21a provided close to the front edge of the packer plate 21. Furthermore, a pair of second hydraulic rams 26 are provided on opposite sides of the tailgate hopper 7, each of the rams 26 having the cylinder end pivotally connected to a pin 15' rigidly fixed on the lower part of the side wall 15 and the end of piston rod also pivotally connected to the tip of the pin 25' projecting from the roller 25.

It should be noted here that the first hydraulic rams 23 are for pivotal rotation of the packer plate 21 between lowered and raised positions, while the second hydraulic rams 26 are for backward and forward movements of the plate 21, and that, especially by the latter, the plate 21 is adapted to be moved sufficiently deep into the container 5 through the discharge opening 14 up to a position immediately before the front edge of the discharge mouth 14'.

Figure 7:
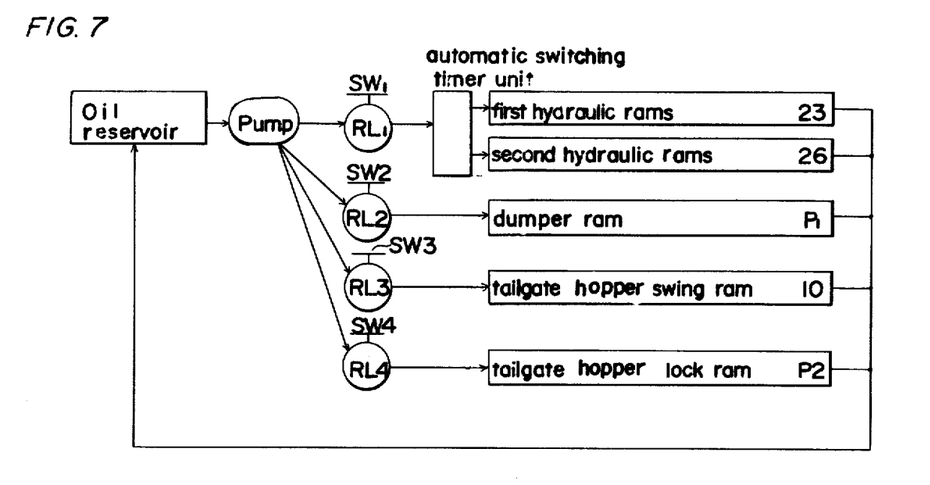
FIG. 7 is a block diagram showing the control of various hydraulic rams according to an embodiment of the present invention.

Referring now to FIG. 7 showing a block diagram for the control of various hydraulic rams, switches SW1, SW2, SW3 and SW4 for actuating solenoid valves RL1, RL2, RL3 and RL4 respectively are provided at a suitable place close to the operator. Upon pushing on the switch SW1, the solenoid valve RL1 is actuated and oil from an oil reservoir is sent to an automatic switching timer unit through a pump. The automatic switching timer unit automatically actuates the hydraulic rams 23 and 26 in turn in a fixed period of time so as to control the packer plate mechanism 20. Other switches SW2, SW3, and SW4 actuate the solenoid valves RL2, RL3 and RL4 which are connected to the dumper ram P1, the tailgate hopper swing rams 10 and the tailgate hopper locking ram P2 respectively and control each of the rams P1, 10 and P2 as earlier described. The oil is adapted to circulate by the pump through each ram back to the reservoir.

Figure 8:
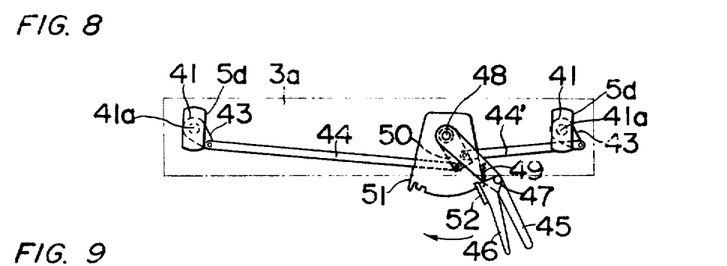
FIG. 8 is a top plan view of a locking device for the container with a locking lever in open position.
Figure 9:
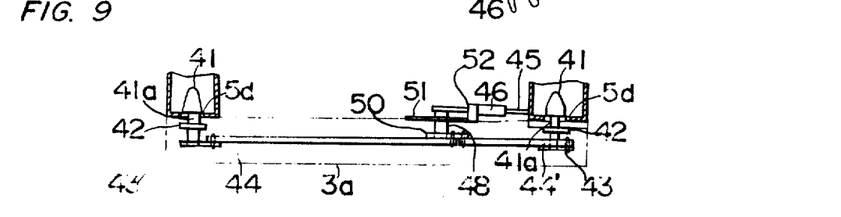
FIG. 9 is a side view of FIG. 8.
Figure 10:
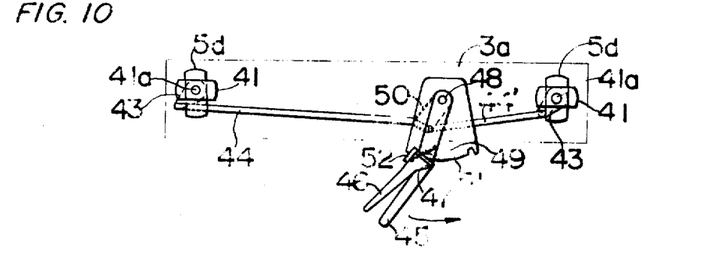
FIG. 10 is a similar view to FIG. 8, but showing the locking lever in closed position.

Referring to FIGS. 8, 9 and 10, the locking device for the container 5 comprises at least four wedge shaped pieces of matal 41 with rectangular bases rotatably provided on the dumper frame 3a at four positions which correspond to the rectangular holes 5d formed at four under corners of the container 5, two pieces of metal 41 in pairs forming a simple link mechanism on each side of the dumper frame 3a. In each pair of the link mechanisms, each of the metal pieces 41 is rigidly fixed to the upper end of a vertical pin 41a, the lower end of the pin 41a being secured on an arm plate 43 through a hole formed on the upper side of the dumper frame 3a and a washer 42. Accordingly, the metal pieces 41 can be rotated by the rotation of the arm plate 43. A vertical pin 48 having a lever 45 rigidly fixed at the upper end and also a pivotal plate 50 secured at the lower end is provided approximately half way between the two separate metal plates 41 through holes formed on a toothed guide plate 51 and the upper side of the dumper frame 3a. The toothed guide plate 51 is fixed on the upper surface of the dumper frame 3a immediately below the lever 5 and has teeth at the arcuate edge thereof remote from the pin 48. The free end of each arm plate 43 remote from the pin 41a is pivotally connected to one end of a connecting rod 44 or 44', while the other ends of the rods 44 and 44' are in turn pivotally connected to the free end of the pivotal plate 50 remote from the pin 48. The lever 45 which is secured to the upper end of the pin 48 is slightly bent in the middle portion, where another short lever 46 having a cog 52 to fit in the teeth of the guide plate 51 is pivotally attached and urged to fall into one of the teeth by a spring 49. When the levers 45 and 46 are grapsed tightly together against the force of the spring 49, the cog 52 leaves the tooth, and the lever 45 together with the pin 48 and the pivotal plate 50 can be turned from one end of the arcuate toothed edge of the plate 51 to another. For removing the container 5 from the dumper frame 3a or mounting it thereon, the lever 45 is kept in the position shown in FIGS. 8 and 9 with each metal piece 41 in the direction corresponding to that of the rectangular hole 5d provided at the under face of each corner of the container 5. For locking the container 5 onto the dumper frame 3a, the levers 45 and 46 are grapsed together and turned to the left to the position shown in FIG. 10, the metal pieces 41 being rotated through the pin 48, the pivotal plate 50, the connecting rods 44 and 44', the arm plates 43 and the pins 41a so that the rectangular bases of the metal plates 41 and the rectangular holes 51d of the container 5 cross each other, thus securing the container 5 to the dumper frame 3a.

Figure 11:
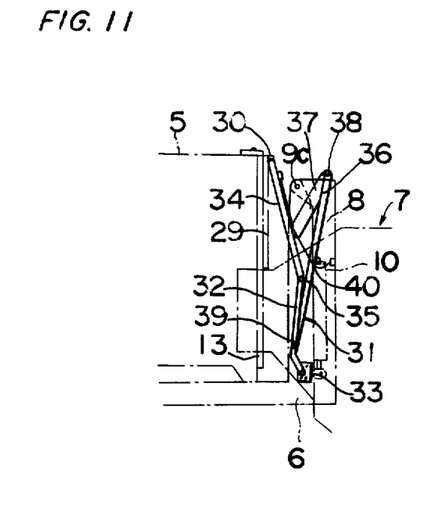
FIGS. 11, 12 and 13 are cross sectional views showing in sequence the operation of a link mechanism for raising or lowering a small door in relation to positions of the tailgate loading hopper.
Figure 12:
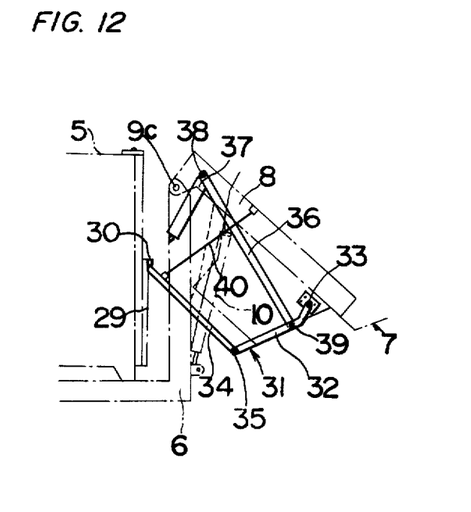
Figure 13:
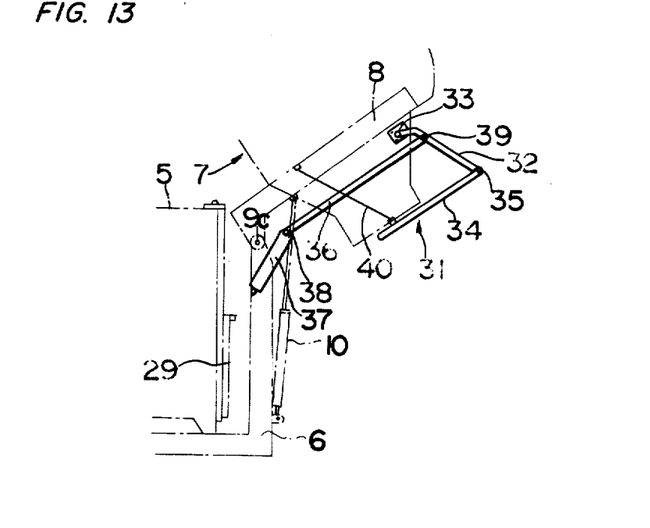

Referring now to FIGS. 11, 12 and 13, a link mechanism 31 for raising or lowering the tailgate hopper 7 is located between the rear of the container 5 and the tailgate loading hopper 7 and comprises a pair of rotating levers 32, rocker arms 34, and connecting rods 36 pivotally connected to one another and provided on opposite sides of the tailgate hopper 7. In each pair shown in FIG. 11, the rotating lever 32 is slightly bent close to the lower end thereof which is rotatably connected to the side wall 15 of the tailgate hopper 7 by a pin 33, while the upper end of the lever 32 is pivotally connected to the lower end of the rocker arm 34 by a pin 35. The upper end of the rocker arm 34 engages the stud 30 provided at each of the upper corners of the small door 29 for the container 5 so as to support the door 29 in the raised position as in FIG. 11. A rectangular supporting plate 37 is fixed obliquely to the upper part of the vertical support 6 close to the pin 9c connecting the support 6 with the arm 8 of the tailgate assembly 7, forming a Y shape with the support 6. The upper end of the connecting rod 36 is rotatably connected to the tip of the supporting plate 37 by a pin 38 with the lower end of the rod 36 pivotally secured to the approximately middle portion of the rocker arm 32 by a pin 39. The link motion formed by the lever 32, the arm 34, the rod 36, and the pins 33, 38 and 39 causes the lever 32 to rotate around the pin 33 through the rod 36 as the tailgate hopper 7 is swung in relation to the axis of the pin 9c. A flexible cable 40 of wire or chain has one end attached to the approxixmately middle portion of the arm 8 and the other end attached close to the upper end of the rocker arm 34 by suitable means and the total length of the cable 40 is adjustable. The cable 40 is adjusted to such a length that it is fully stretched when the tailgate hopper 7 is rotated to the uppermost position leaving the container 5 as in FIG. 13 through the state shown in FIG. 12 with the refuse receiving opening 13 of the container 5 closed by the small door 29 and the tip of the rocker arm 34 disengaged from the stud 30 of the door 29. It is so arranged that in the refuse collecting condition where the discharge mouth 14' of the tailgate hopper 7 is inserted into the opening 13 of the container 5 as shown in FIG. 11, the upper ends of the rocker arms 34 engage the studs 30 fixed on opposite upper corners of the small door 29, keeping the door 29 in the raised position with the cable 40 sagging.

It should be noted that the small door 29 is adapted by the above link mechanism, to be slidably raised so as to open the refuse receiving opening 13 when the tailgate hopper 7 is in the lowered position and to be lowered by its own weight so as to close the opening 13 when the tailgate hopper 7 is in the raised position.

By this arrangement, the operation of the refuse collection vehicle according to the present invention is described hereinbelow.

Figure 1:
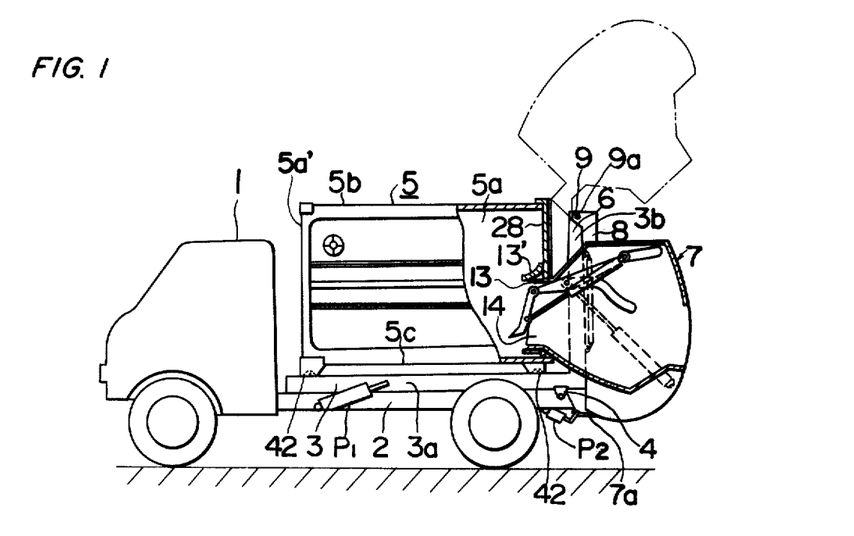
FIG. 1 is a side elevational view of a refuse collection vehicle incorporating the container and the tailgate loading hopper in accordance with the present invention, with a portion broken away.
Figure 14:
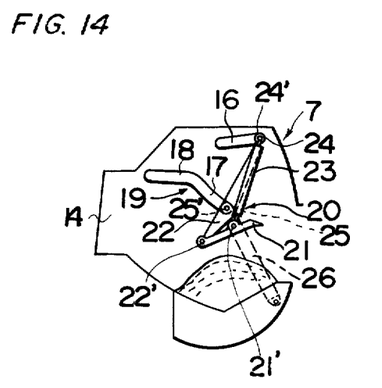
FIGS. 14, 15, 16 and 17 are cross sectional views showing in sequence the operation of the packer plate mechanism in the tailgate loading hopper.
Figure 15:
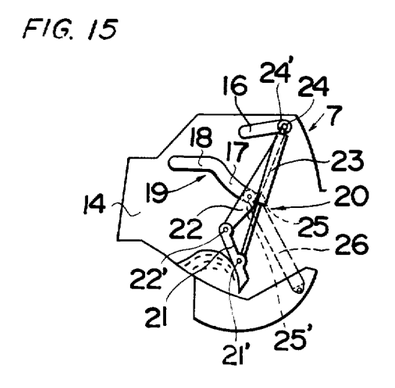
Figure 16:
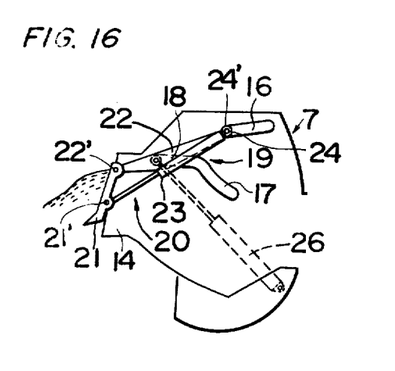

Referring now to FIGS. 14, 15, 16 and 17 showing operations of the tailgate hopper 7 for pushing the refuse dumped into the rear opening 12 into the container 5 when the discharge mouth 14' is inserted into the refuse receiving opening 13 of the container 5 as shown in FIGS. 1, 4 and 5, the first and the second hydraulic rams 23 and 26 are contracted to the minimum lengths in FIG. 14 so that the packer plate mechanism 20 is supported at the rearmost ends of the upper guide slots 16 and middle guide slots 19 with the packer plate 21 swung to the raised position, thus providing sufficient space under the packer plate 21 for the refuse to be dumped into the rear opening 12. When the first hydraulic rams 23 are extended as in FIG. 15, the packer plate 21 is turned downward in relation to the pivotal connections 22', compressing the refuse dumped in. In this state, when the second hydraulic rams 26 are extended, the upper ends of the arms 22 provided with the rollers 24' remains as they are in the rear ends of the upper guide slots 16 at the initial stage of extension of the rams 26, and the arm plates 22 rotate clockwise in relation to the axis of the shaft 24 with the rollers 25 at the middle portions of the plates 22 sliding along the lower guide slots 17, consequently the packer plate 21 pushing the refuse forward. Further extension of the rams 26 bring the middle rollers 25 from the curved slots 17 onto the horizontal slots 18 of the middle guide slots 19 with the upper rollers 24' gradually moving forward along the slots 16, consequently the packer plate mechanism 20 pushing the packer plate 21 forward, with the refuse piled up in front of the plate 21, to such an extent that the packer plate 21 goes sufficiently deep within the container 5 up to the position immediately before the front edge of the discharge mouth 14', completely pushing the refuse into the container 5 through the discharge opening 14 as shown in FIG. 16.

Figure 17:
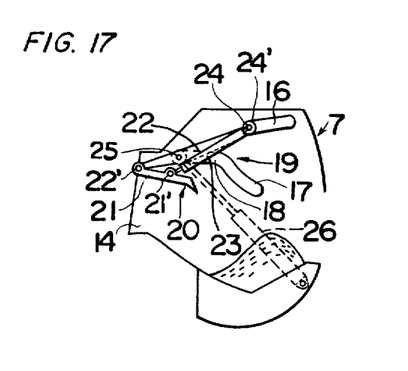

Upon completion of the above pushing-in operation, the first hydraulic rams 23 is contracted followed by the contraction of the second hydraulic ram 26 as shown in FIG. 17 to bring the packer plate assembly 20 back into the original condition shown in FIG. 14.

By the repetition of the above loading cycle, the refuse can be packed into the container 5 at a maximum density.

When the container 5 is filled up as above and the refuse collection vehicle reaches a refuse collection center for removal of the container 5 from the dumper frame 3, the refuse receiving opening 13 of the container 5 is closed with the small door 29 and by merely replacing the above filled-up container by a separate empty container, the vehicle can immediately set out for another refuse collection.

Referring back to FIGS. 11, 12 and 13, when the container 5 filled up with refuse is to be removed from the dumper frame 3a, the tailgate assembly 7 is gradually rotated to the raised position in relation to the pins 9c by the action of the hydraulic ram 10, the container 5 being separated from the tailgate hopper 7. At this time, in association with the upward rotation of the tailgate hopper 7 in relation to the pins 9c, the rotating levers 32 are rotated counterclockwise in relation to the axis of the pins 33 through the connecting rods 36 by the four bar links formed by the pins 9c, 33, 38 and 39 with the lines connecting the pins 9c and 38 as fixed bases as shown in FIG. 12. Accordingly, the rocking arms 34 pivotally connected in the rotating levers 32 turn downward in relation to the pin 35 and the small door 29 of the container 5 supported by the upper ends of the arms 34 at the studs 30 gradually descends by its own weight to close the opening 13 of the container 5. When the small door 29 completely closes the opening 13, the tips of the arms 34 leave the studs 30 with the cable 40 stretched, without turning the rocking arms 34 further downward even when the tailgate hopper 7 is rotated to a higher position.

In the state where the tailgate hopper 7 is fully raised, the rocking arms 34 are away from the small door 29 together with the rotating levers 32, being supported by the cable 40. Accordingly, the filled-up container 5 is ready for unloading by suitable machines, such as fork lifts.

For loading an empty container 5 on the dumper frame 3a, the tailgate assembly 7 is fully raised, and then lowered after the empty container 5 has been loaded. In the course of the lowering, the upper ends of the rocking arms 34 suspended by the cable 40 engage the studs 30 of the small door 29, and the rotating lever 32 being rotated clockwise by the connecting rods 36 in relation to the pin 33 raise the small door 29 through the rocking arms 34 and open the refuse receiving opening 13 of the container 5, simultaneously the discharge mouth 14' of the tailgate hopper 7 being inserted into the opening 13 of the container 5 ready for further refuse collection. The cable 40 for supporting the rocking arm 34 is in a sagged condition while the upper ends of the rocking arms 34 are engaging the studs 30 of the small door 29 during the raising or lowering of the door 29.

As is clear from the above description, the present invention provides a very efficient refuse collection vehicle by which the disposal of the collected refuse is carried out by merely replacing the filled-up container by an empty one, thus enabling the vehicle to be engaged only in the refuse collection. In the refuse collection, as the discharge opening of the tailgate loading hopper is provided with the separate discharge mouth secured to the discharge opening and extending outwardly from the discharge opening, the discharge mouth is advantageously inserted into the refuse receiving opening of the container when the tailgate hopper is in the lowered position, thus preventing refuse from spilling during packing operation even when the container is fully packed with the refuse.

The packer plate which is adapted to go sufficiently deep into the container through refuse receiving opening in the position beyond the edge of the discharge mouth of the tailgate hopper in the forward movement during packing operation effectively forces the refuse into the container at a maximum density.

Furthermore, the provision of the small door and the rubber plate for the refuse receiving opening of the container is very effective for preventing the strewing of the refuse especially when the tailgate loading hopper is disengaged from the container for replacing the filled-up container with an empty one. When the container is mounted on the dumper frame, the opening and closing of the small door is closely associated with the rotation of the tailgate loading hopper between the lowered and raised positions, which assists greatly in efficient refuse collection.

Although the present invention has been fully described by way of example with reference to the attached drawings, it is to be noted that various changes and modifications are apparent to these skilled in the art. For example, the discharge mouth as described to be separately secured to the discharge opening of the tailgate hopper may be integrally formed with the tailgate hopper. Therefore, unless otherwise such changes and modifications depart from the scope of the present invention, they should be construed as included herein.

What is claimed is:

1. A refuse collection vehicle of a rear loading type which generally comprises a dumper frame mounted on the rear of a vehicle chassis, a container of a box shape for packing refuse therein to be interchangeably mounted on said dumper frame and having a refuse receiving opening at the rear thereof, means for locking said container on said dumper frame, a small door provided on said refuse receiving opening for selectively opening or closing the latter and having a sufficient size to cover said refuse receiving opening, means for driving said small door between opened and closed positions, a tailgate loading hopper of a box shape formed with a discharge opening of a corresponding size to said refuse receiving opening and a rear opening opposed to said discharge opening, and supported at the rear of said container for pivotal movement, means for swinging said tailgate loading hopper between raised and lowered positions, said swinging means for said tailgate loading hopper in turn actuating said driving means for said small door which is provided between the rear of said container and the front of said tailgate loading hopper so that said small door is closed when said tailgate loading hopper is in said raised position and the former is opened when the latter is in said lowered position, said discharge opening being adapted to face said refuse receiving opening so as to bring the former in communication with the latter when said tailgate loading hopper is in said lowered position, a packer plate housed in said tailgate loading hopper for forcing refuse dumped in said rear opening into said container through said discharge opening, and means for driving said packer plate for pushing said refuse between a rear position close to said rear opening and a foremost position sufficiently deep in said container through said discharge opening when said refuse receiving opening is in communication with said discharge opening in said lowered position of said tailgate loading hopper.

2. A refuse collection vehicle of a rear loading type as claimed in claim 1, wherein said tailgate loading hopper has a separate discharge mouth secured to said discharge opening and extending outwardly from said discharge opening, said discharge mouth being engageable into said container through said refuse receiving opening of said container when said tailgate loading hopper is in said lowered position.

3. A refuse collection vehicle of a rear loading type as claimed in claim 2, wherein said refuse receiving opening of said container is provided with a resilient plate around the edge thereof so as to selectively open or close said refuse receiving opening according to insertion or withdrawal of said discharge mouth into or from said refuse receiving opening.

4. A refuse collection vehicle of a rear loading type as claimed in claim 2, wherein said tailgate loading hopper has a discharge mouth integrally formed with said tailgate hopper and extending outwardly from said discharge opening.

5. A refuse collection vehicle of a rear loading type as claimed in claim 1, wherein said container comprises a part of side walls, a bottom, a ceiling wall and front and rear walls, all assembled into a box like shape, said rear wall being hinged to provide a large opening for removal of refuse within said container to the outside thereof, said refuse receiving opening being formed at the lower part of said rear wall.

6. A refuse collection vehicle of a rear loading type as claimed in claim 5, wherein said container has a rectangular hole formed at the under face of each corner thereof so as to receive a corresponding rectangular metal piece rotatably provided on said dumper frame, said locking means being adapted to fasten or release said container to or from said dumper frame when said container is mounted on said dumper frame.

7. A refuse collection vehicle of a rear loading type as claimed in claim 1, wherein said small door is adapted to be slidably raised over said refuse receiving opening along grooves provided at opposite sides of said small door so as to open said refuse receiving opening when said tailgate loading hopper is in said lowered position and to be slidably lowered by its own weight so as to close said refuse receiving opening when said tailgate loading hopper is in said raised position.

8. A refuse collection vehicle of a rear loading type as claimed in claim 1, wherein said tailgate loading hopper is adapted to be locked in said lowered position by means of a hook fixed at the lower edge thereof and a hydraulic ram pivotally connected to the rear of said vehicle chassis, said hook being adapted to releasably engage a piston rod end of said hydraulic ram.

9. A refuse collection vehicle of a rear loading type as claimed in claim 1, wherein said driving means for said small door comprises link means and hydraulic power means, said swinging means for said tailgate loading hopper comprises hydraulic power means, and said driving means for said packer plate comprises bearing means and first and second hydraulic power means, each of said hydraulic power means being controlled by a control means so that when said tailgate loading hopper is lowered, said small door is opened with said packer plate movable between said rear position and said foremost position, and when said tailgate loading hopper is raised, said small door is closed.

10. A refuse collection vehicle of a rear loading type as claimed in claim 1, wherein said tailgate loading hopper comprises a pair of side walls, a ceiling plate and a bottom plate which define said discharge opening at the front of said tailgate loading hopper and said rear opening at the rear thereof.

11. A refuse collection vehicle of a rear loading type as claimed in claim 1, wherein said packer plate extends across the width of said discharge opening with height corresponding to the height of said discharge opening so as to force refuse through said discharge opening into said container.

12. A refuse collection vehicle of a rear loading type as claimed in claim 1, wherein said means for driving said packer plate comprises first and second hydraulic power means including arm plates and guide means for said arm plates, said first hydraulic means being adapted to swing said packer plate about pivot axes between raised and lowered positions, said second hydraulic means being adapted to drive said packer plate through said arm plates between said rear position and said foremost position sufficiently deep in said container through said discharge opening when said tailgate loading hopper is in said lowered position.

13. A refuse collection vehicle of a rear loading type as claimed in claim 12, wherein said guide means comprises upper guide slots and middle guide slots formed in side walls of said tailgate loading hopper, each of said upper guide slots extending from the rear to the front at the upper part of said side wall while each of said middle guide slots comprises a curved portion rising upwardly and forwardly and a straight portion extending from the rear to the front at the middle part of said side wall.

14. A refuse collection vehicle of a rear loading type as claimed in claim 1, wherein said tailgate loading hopper extending the width of said container is pivotally supported by pivot axes adjacent upper ends of supports formed by upright portions of said dumper frame extending at right angles at the rear of said dumper frame.

* * * * *